(12) United States Patent
Forbes

(10) Patent No.: US 10,065,748 B2
(45) Date of Patent: Sep. 4, 2018

(54) GALLEY INSERT MOUNTING SYSTEM

(71) Applicant: B/E AEROSPACE, INC., Wellington, FL (US)

(72) Inventor: James R. Forbes, Anaheim, CA (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

(21) Appl. No.: 13/849,808

(22) Filed: Mar. 25, 2013

(65) Prior Publication Data

US 2013/0256479 A1  Oct. 3, 2013

Related U.S. Application Data

(60) Provisional application No. 61/616,969, filed on Mar. 28, 2012.

(51) Int. Cl.
| | | |
|---|---|---|
| *B64D 11/04* | (2006.01) | |
| *B64D 47/00* | (2006.01) | |
| *B64D 11/00* | (2006.01) | |

(52) U.S. Cl.
CPC .......... *B64D 47/00* (2013.01); *B64D 11/0007* (2013.01); *B64D 11/04* (2013.01)

(58) Field of Classification Search
CPC ................................ B64D 11/04; B64D 47/00
USPC .................. 248/205.1, 679, 678; 292/36, 41
See application file for complete search history.

(56) References Cited

U.S. PATENT DOCUMENTS

| | | | |
|---|---|---|---|
| 596,050 A * | 12/1897 | Byrnes ............................ | 292/36 |
| 1,197,612 A * | 9/1916 | Ditlevson ....................... | 292/36 |
| 2,159,247 A | 5/1939 | Boom | |
| 2,916,233 A | 12/1959 | Ecker | |
| 4,314,691 A * | 2/1982 | Sato .............................. | 254/126 |
| 4,612,603 A * | 9/1986 | Cook ............................. | 361/809 |
| 5,595,076 A | 1/1997 | Weinerman et al. | |
| 6,705,136 B2 * | 3/2004 | Porter ................. | E05B 47/0002 |
| | | | 109/59 R |

(Continued)

FOREIGN PATENT DOCUMENTS

| | | |
|---|---|---|
| DE | 102008064084 A1 | 7/2010 |
| EP | 0402766 A1 | 12/1990 |

(Continued)

OTHER PUBLICATIONS

EPO, International Search Report and Written Opinion in counterpart International Application No. PCT/US2013/034032.

*Primary Examiner* — Kristina N Junge
(74) *Attorney, Agent, or Firm* — Donna P Suchy

(57) ABSTRACT

A mounting system for an aircraft galley that quickly and easily secures an insert while preserving an air gap between the insert and a work deck upper surface for venting purposes. The platform includes a linkage that can transform from a "Y" shaped configuration to a "T" shaped configuration. When the linkage is in the "Y" shaped configuration, the outer extensions or locking pins do not extend to the side walls of the platform. However, once the insert is properly seated on the platform, the linkage can be transformed from the "Y" configuration to a "T" configuration such that the locking pins extend through the side walls of the platform and through holes in the side walls of the insert. In this manner, the insert can be secured to the platform without screws or other permanent fixtures.

12 Claims, 6 Drawing Sheets

(56) References Cited

U.S. PATENT DOCUMENTS

2002/0014556 A1    2/2002   Li
2002/0178771 A1   12/2002   Porter
2012/0006941 A1    1/2012   Tan et al.

FOREIGN PATENT DOCUMENTS

JP          H0642600 U    6/1994
JP          H11240494 A   9/1999

* cited by examiner

GALLEY INSERT MOUNTING SYSTEM

CROSS-REFERENCES TO RELATED APPLICATIONS

This application claims priority from U.S. application Ser. No. 61/616,969, filed Mar. 28, 2012, the contents of which are fully incorporated herein by reference in its entirety.

BACKGROUND

An aircraft galley refers to the area of the vehicle that is used by the flight attendants to service the passengers, particularly the passengers' food and beverage needs. Due to constraints with space and weight, these areas are very ordered and efficient in all aspects of their construction and arrangement. There are a number of appliances in the galley, referred to as "inserts" that can be arranged in various ways. Inserts can be appliances such as a coffee brewers, ovens, a trash compactors, refrigerators, chillers, espresso machines, or any other electrical appliance that can be found in the galley area. These devices tend to be heavy and must be securely mounted in the galley so that they are not displaced during turbulence, but they must also be versatile enough to be moved if needed depending upon the spatial needs of the aircraft. Also, if the inserts need to be serviced it is desirable that they be easily removed and replaced. Thus, the mounting system of the inserts must be both secure and reliable, but versatile and meet the other needs of the galley.

To mount the inserts in the galley, they are typically affixed with mounting screws that attach the insert to the work deck of the galley. However, to mount an insert to the working deck of an aircraft galley requires that the insert be flush with the deck, which tends to cause venting issues with devices such as refrigerators or ovens that use fans to cool the motor of the insert. Therefore, there is a need for a mounting system for a galley insert that provides reliable and secure insert placement while allowing for venting and making repair and replacement a simple and easy operation.

SUMMARY OF THE INVENTION

The present invention is a mounting system for an aircraft insert that quickly and easily secures an insert while preserving an air gap between the insert and the work deck upper surface that allows venting, without using mounting screws. A platform is formed on the work deck that includes side walls that support the insert such that the insert sits on the side walls to create a gap between the bottom of the insert and the floor of the platform. The platform is also fitted with a linkage that can transform from a "Y" shaped configuration to a "T" shaped configuration. When the linkage is in the "Y" shaped configuration, the outer wings, or locking pins, do not extend to the side walls of the platform. In this position, the insert can be located on the platform but is not secured to the platform. However, once the insert is properly seated on the platform, the linkage can be transformed from the "Y" configuration to the "T" configuration such that the locking pins extend through the side walls of the platform and through holes in the side walls of the insert. In this manner, the insert can be secured to the platform without screws or other permanent fixtures. When it is necessary for the insert to be removed, as for cleaning, maintenance, or the like, the linkage is returned to the "Y" configuration, withdrawing the locking pins and releasing the insert.

Other features and advantages of the present invention will become more apparent from the following detailed description of the preferred embodiments in conjunction with the accompanying drawings, which illustrate by way of example the operation of the invention.

DETAILED DESCRIPTION OF THE PREFERRED EMBODIMENTS

Figure 1:
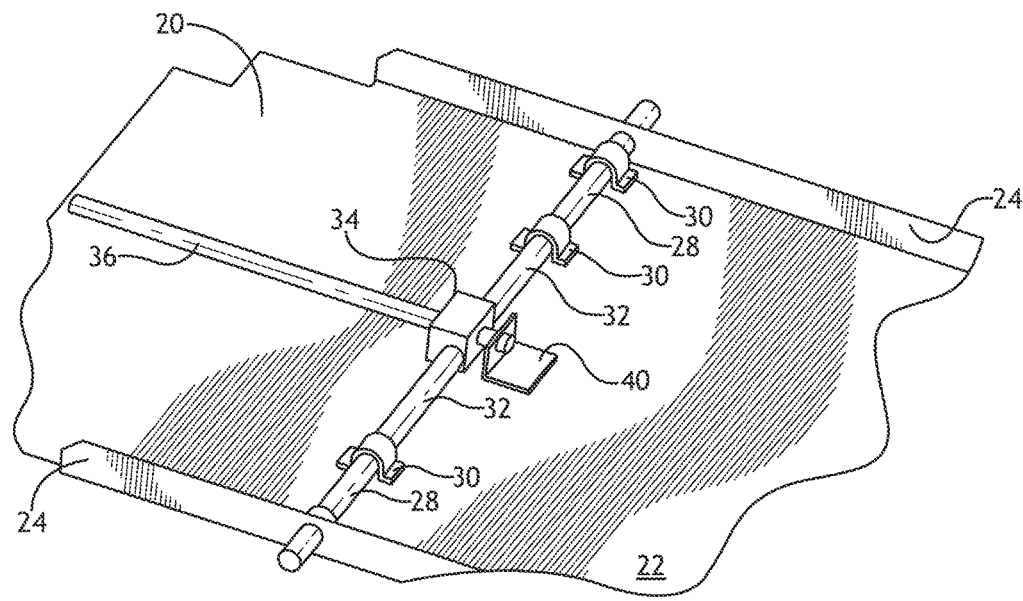
FIG. 1 is an elevated, perspective view of the galley insert mounting system of the present invention where the linkage is in the "T" configuration.
Figure 2:
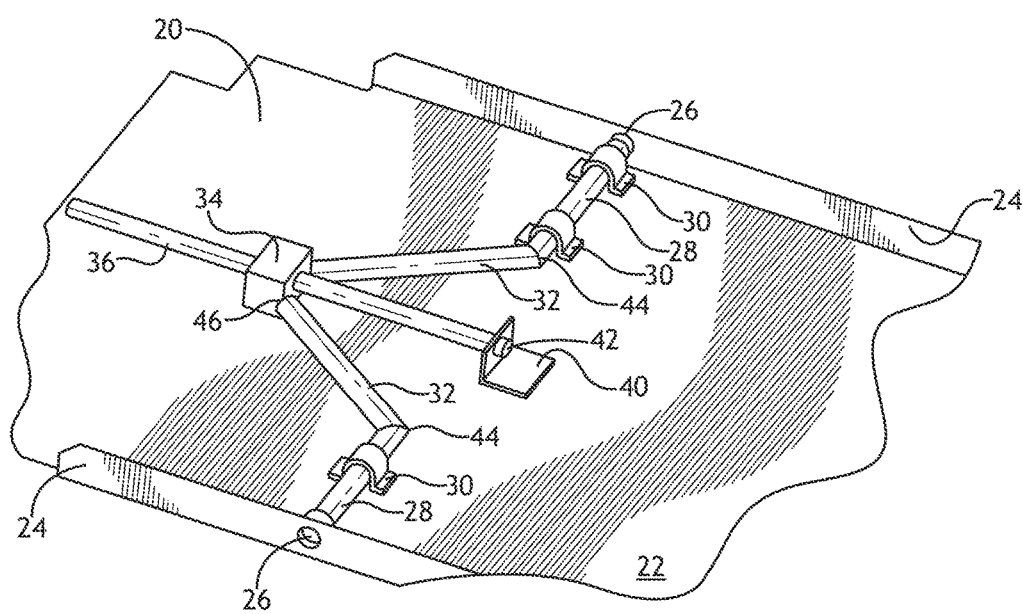
FIG. 2 is an elevated, perspective view of the galley insert mounting system of the present invention where the linkage is in the "Y" configuration.

FIGS. 1 and 2 illustrate a linkage assembly that can be used to secure a galley insert, such as a refrigerator, to a galley work deck without using mounting screws to attach the insert to the deck. A platform 20 is formed with a floor 22 and short lateral side walls 24, where the side walls 24 are formed with a through hole 26 that is aligned along a common centerline. Each hole 26 is sized to receive a locking pin 28 secured to the platform 20 by a pair of mounting brackets 30, such as O-ring brackets. The locking pins 28 are each hinged or linked (e.g., via a flexible connection 44) to a push rod 32, which are in turn flexibly mounted to a block 34 via flexible connections 46. The block 34 is threadedly engaged with a drive rod 36, a distal end 38 of which is secured to an "L" shaped bracket 40 mounted on the floor 22 of the platform 20. The "L" shaped bracket 40 allows rotation of the drive rod 36 while maintaining the end 42 of the drive rod 36 in a fixed position.

Figure 3:
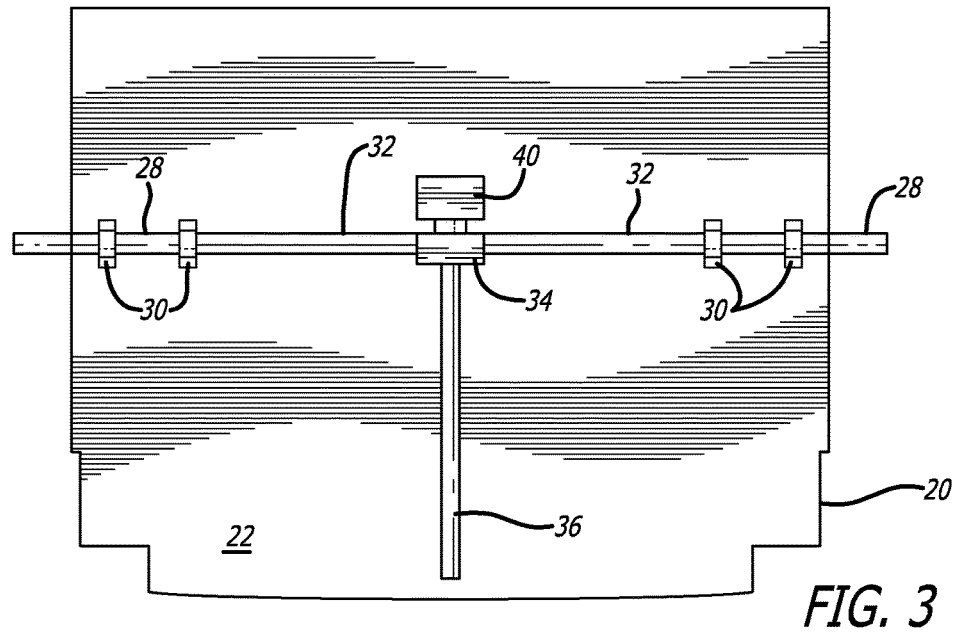
FIG. 3 is a top view of the galley insert mounting system of the present invention where the linkage is in the "T" configuration.
Figure 4:
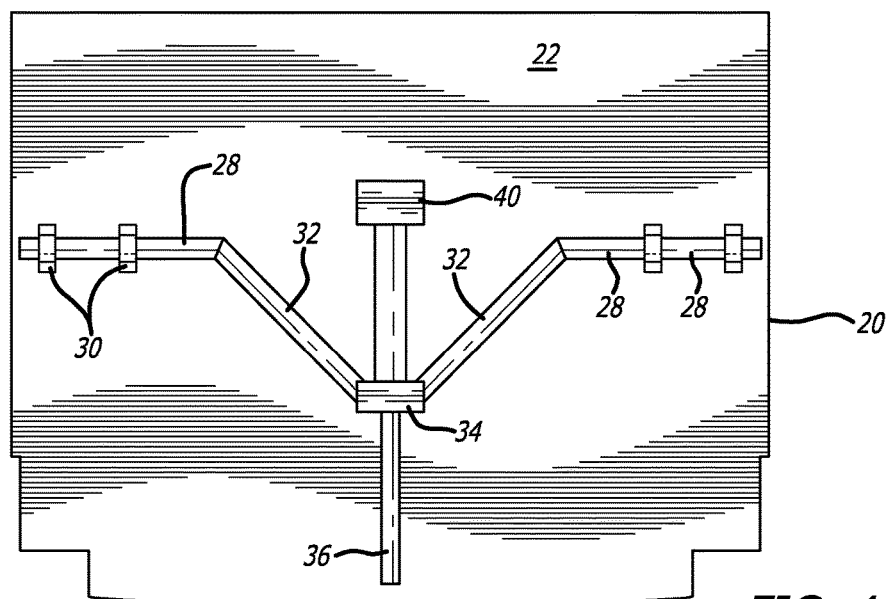
FIG. 4 is a top view of the galley insert mounting system of the present invention where the linkage is in the "Y" configuration.

When the platform 20 is in the disengaged position of FIG. 2, the locking pins 28 are withdrawn from the side walls 24 and the block 34 is displaced from the "L" shaped bracket 40. In this position, an insert such as a galley refrigerator can be set upon the platform 20 for securing. The drive rod 36 plus the push rods 32 in this position form a "Y" configuration, such as a yoke. To engage the platform's locking function, the drive rod 36 is rotated in a first direction, which causes the block 34 to move along the drive rod 36 towards the "L" shaped bracket 40. As the block 34 is pushed along the drive rod 36 by the threaded engagement between the two elements, the ends of the push rods 32 connected to the locking pins 28 begin to move apart. As the block 34 further moves along the drive rod 36, the push rods 32 eventually become colinear and the locking pins are pushed through the holes 26 of the side walls 24, as shown in FIG. 1. In this configuration, the push rods 32 and the drive rod 36 form a "T" configuration and the locking pins 28 are fully extended through the side walls 24. To release the locking pins 28, the drive rod 36 is rotated in the opposite direction, causing the block 34 to move away from the "L" shaped bracket. As the block 34 recedes, the push rods 32 return to their position in FIG. 2, pulling the push rods 28 back inside the side walls 24. This releases any insert that was locked by the linkage. FIGS. 3 and 4 illustrate the linkage in the extended (FIG. 3) and retracted (FIG. 4) positions.

Figure 5:
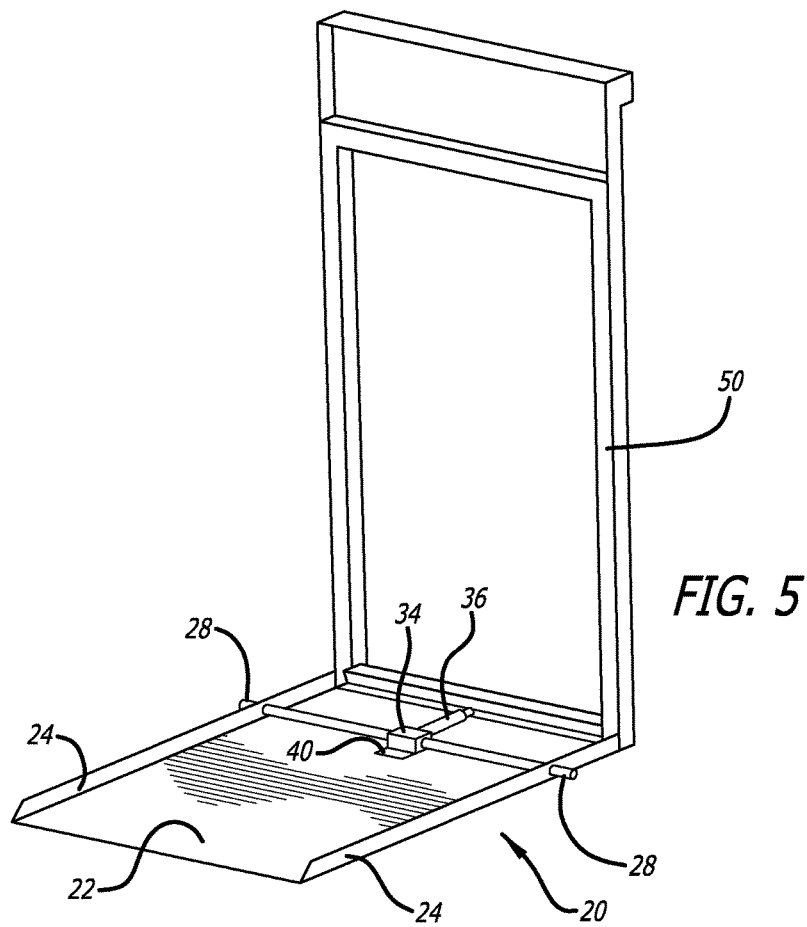
FIG. 5 is an elevated, perspective view of an insert face plate cooperating with the galley insert mounting system.
Figure 6:
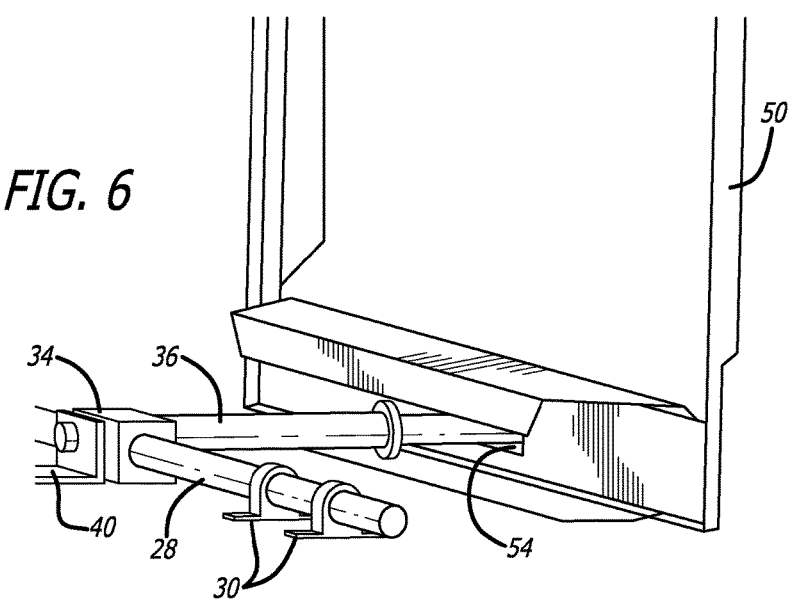
FIG. 6 is an enlarged, view of the linkage and bracket.
Figure 7:
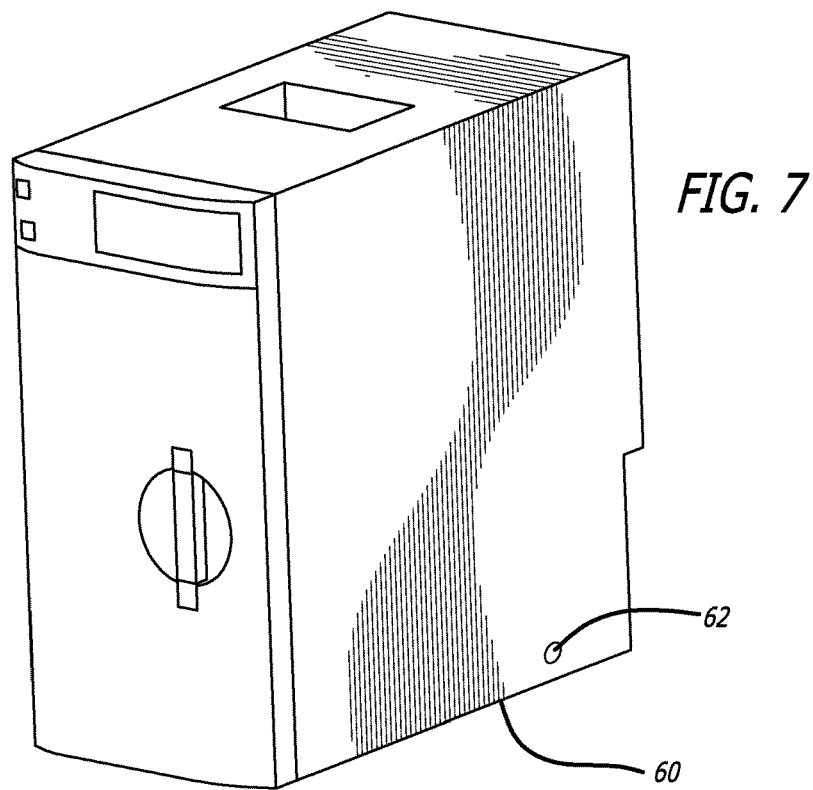
FIG. 7 is an elevated perspective view of a generic insert such as a chiller.
Figure 8:
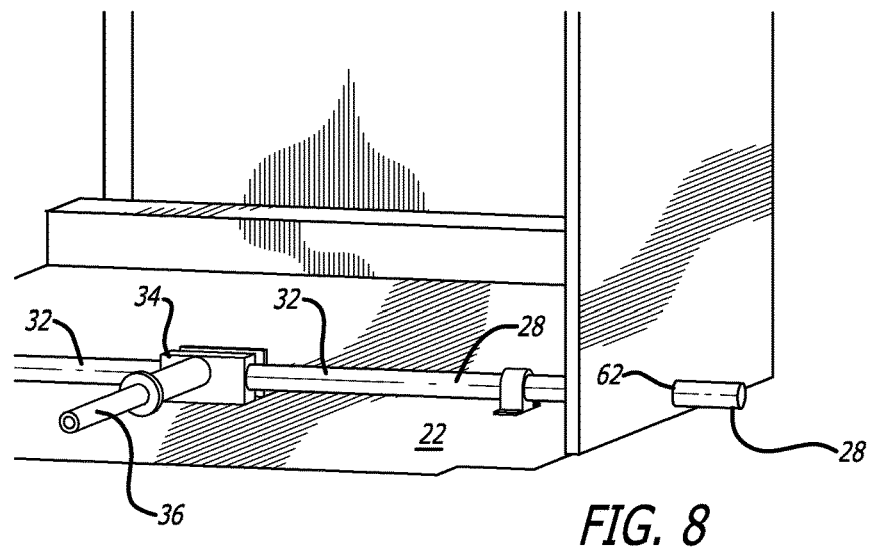
FIG. 8 is an enlarged, perspective view of the linkage cooperating to secure to the insert.
Figure 9:
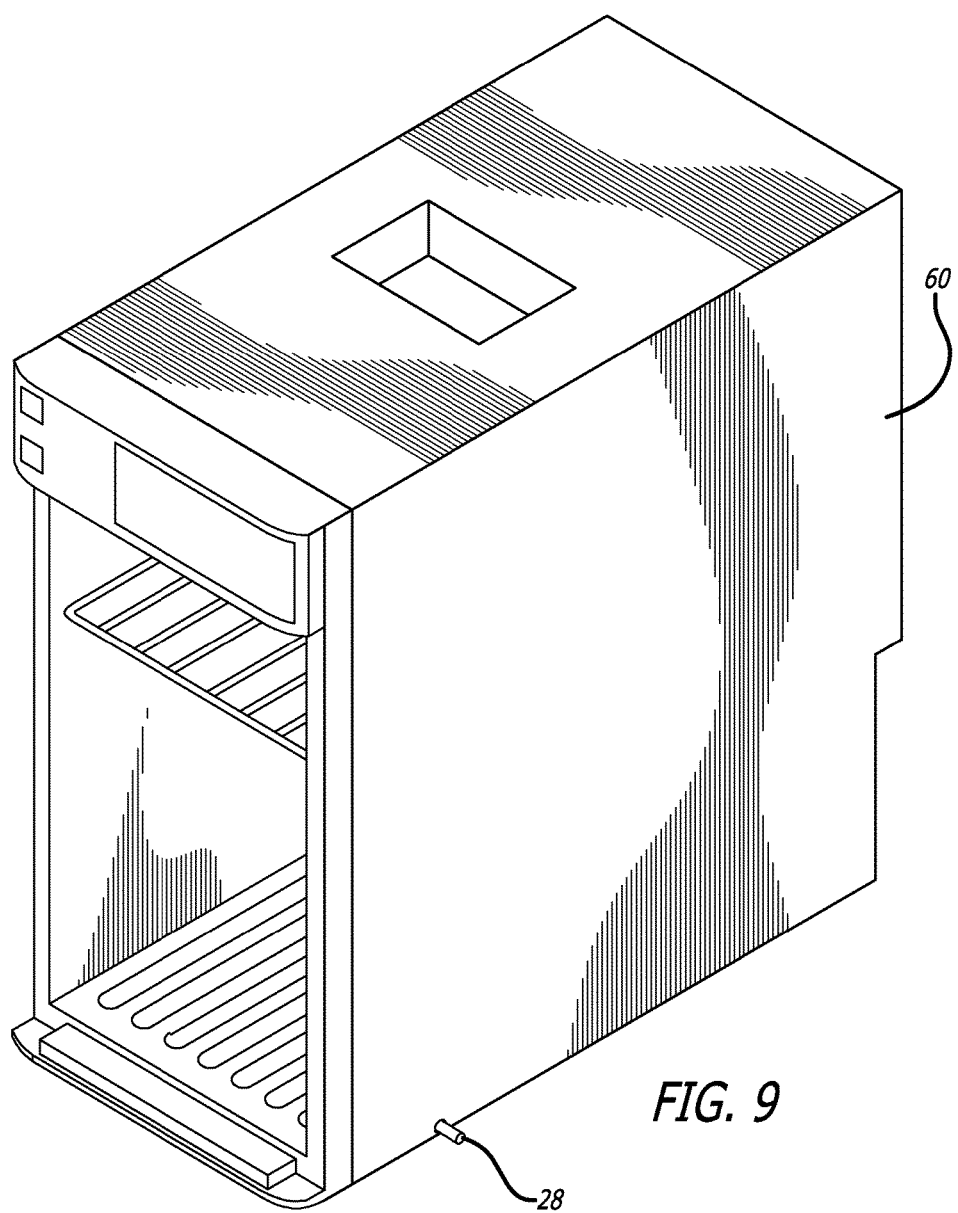
FIG. 9 is the insert shown with the linkage protruding through its side walls to secure the insert.
Figure 10:
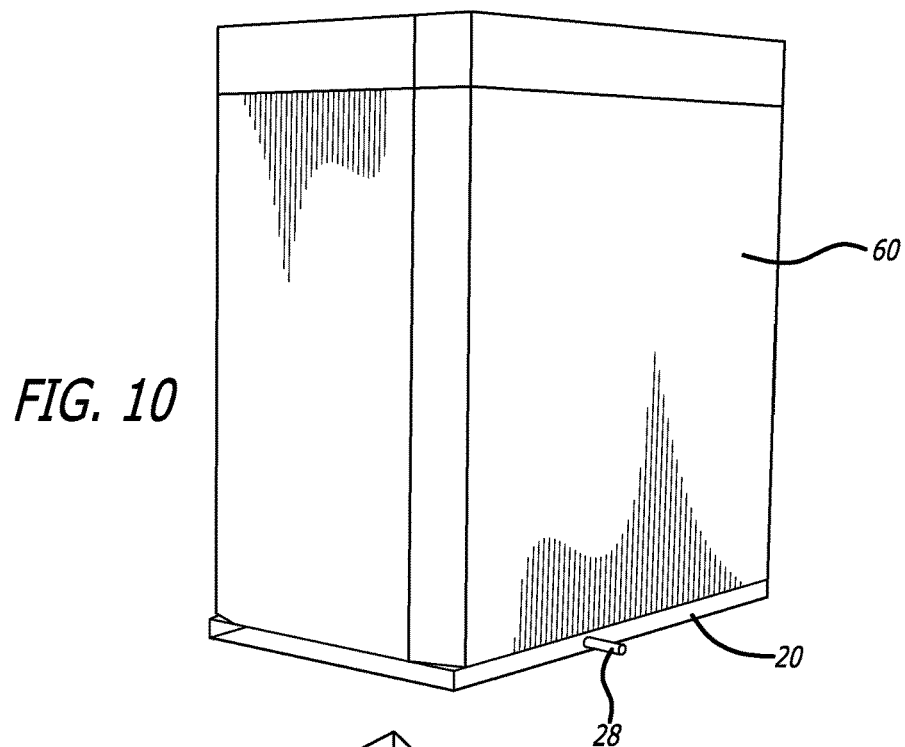
FIG. 10 is a perspective view of the insert with the linkage protruding through to secure the insert.
Figure 11:
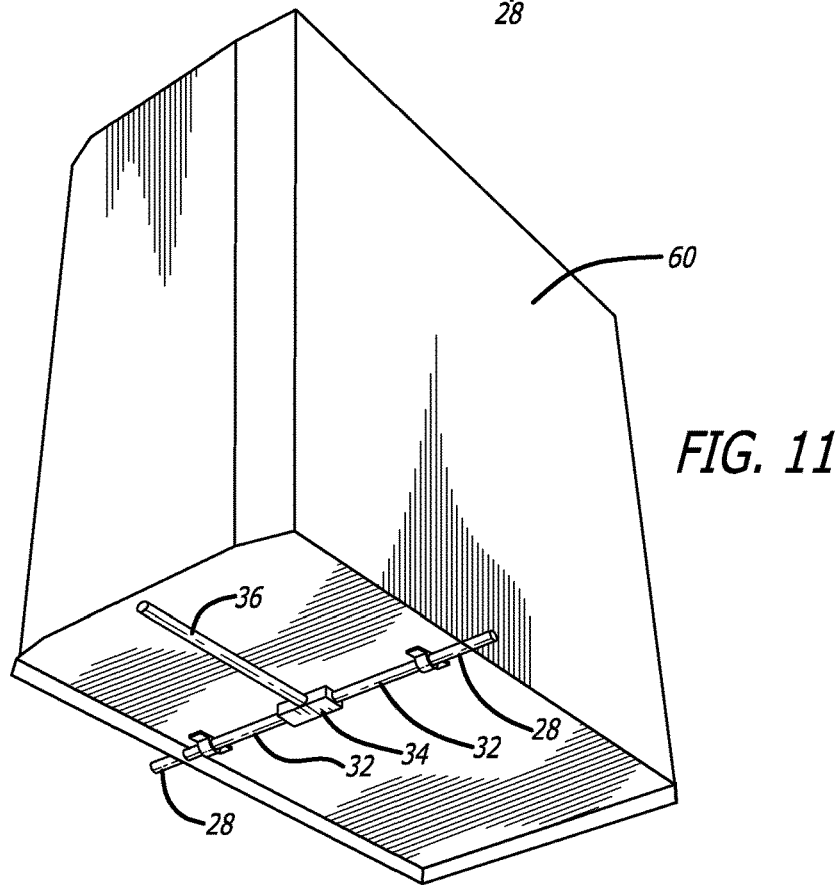
FIG. 11 is a view from below showing the insert locked to the platform.

FIG. 5 illustrates the platform 20 mounted to a face plate 50 for an insert such as a refrigerator to be mounted to the work deck of a galley. The face plate 50 includes a window 54 (See FIG. 6) that receives the drive rod 36 so that it may be accessed outside of the insert 60. The sides of the insert 60 include a hole 62 that receives the locking pin 28 when it is in the extended position of FIGS. 1 and 3. That is, the locking pins extend through the side walls 24 of the platform 20 (FIG. 8) and through the holes 62 in the insert 60, securing the insert 60 to the platform 20. The locking pins 28 can be withdrawn easily by rotating the drive rod 36 which extends outside of the insert 60, thereby providing a reliable and easy manner in which to secure the insert. FIGS. 9 and 10 illustrate the insert 60 locked using the protruding locking pins 28. FIG. 11 shows how the side walls 24 of the insert can create a gap below the insert 60 so that venting can take place. This is important for refrigerators, ovens, chillers, and other electrical equipment that can overheat if confined in tight quarters without sufficient ventilation. Thus, the present invention not only secures the insert 60, but allows ventilation beneath the insert.

When an insert is mounted in a galley using the present invention, the side projections (locking pins) align with holes in an adjacent bracket, wall, partition, or other fixed portion of the galley structure. In this way, the side projections restrain the insert within the galley structure without any direct attachment to the work deck.

In a preferred embodiment, the insert 60 incorporates both the platform 20 and the face plate 50 as an integral component, such that each insert includes its own integral locking mechanism within its base. The drive rod can be rotated from outside the insert, which will cause the locking pins to extend through the side walls of the platform and through holes in the insert. This allows a quick method in which an insert can be positioned and locked in place without the need for mounting screws that penetrate the floor of the deck. Instead, the mounting system shown above releasably mounts the insert using only the drive rod to extend the locking pins. The drive rod can be rotated using a screwdriver or other tool, so the insert can be quickly positioned and locked into place on the platform.

When an insert is mounted in a galley, the locking pins of the linkage align with holes in the platform's side walls and the insert's holes, or an adjacent bracket, wall, partition or other fixed portion of the galley structure. In this way, the locking pins restrain the insert within the galley structure without any direct attachment to the work deck. This is important because recent galley designs can have a work deck that slides forward from underneath the inserts to provide an increased work surface area for the flight attendants. Further, newer galley designs route cooling air for the galley carts through the work deck so the present invention is advantageous because it eliminates the need for penetrations through the work deck for mounting screws that could allow for cooling air leaks.

Although various embodiments have been described, it is to be understood that various modifications and substitutions would be appreciated by one of ordinary skill in the art, and the present invention is intended to include all such modifications and substitutions. Accordingly, nothing in this specification or the drawings should be construed as limiting or exclusive unless expressly indicated. Rather, the scope of the invention is measured by appended claims, using the plain and ordinary meaning of the words in view of, but not exclusive to, the description herein.

I claim:

1. A system comprising:
   an aircraft galley insert;
   a platform having first and second side walls, said first and second side walls including an first and second respective apertures;
   a bracket mounted on the platform including a plate perpendicular to the platform, said plate having an aperture sized to receive a rod therein;
   a drive rod secured by the bracket, wherein the bracket allows for rotation of the drive rod while maintaining the drive rod in a fixed position;
   a block disposed on the drive rod, said block slidable along the drive rod from a first position on the platform to a second position on the platform;
   first and second push rods attached to the block, said first and second push rods arranged in a colinear arrangement when the block is in the first position and arranged in a "V"-shaped arrangement when the block is in the second position; and
   first and second locking pins, each locking pin coupled to a respective one of the first and second push rods, and oriented in a direction transverse to the drive rod and passing through said respective first and second apertures on the first or second side wall, the first and second locking pins extended through said respective first and second apertures on the first or second side wall when the block is in the first position and said first and second locking pins are retracted from said respective first and second apertures on the first or second side wall when the block is in the second position,
   wherein the aircraft galley insert is releasably installed on the platform by utilizing the bracket, the drive rod, the block, the first and second push rods, and the first and second locking pins.

2. The system of claim 1, wherein the aircraft galley insert further comprises a face plate, wherein the platform is configured to rigidly attach to the face plate.

3. The system of claim 2, wherein the face plate comprises an aperture providing external access to the drive rod upon mounting.

4. The system of claim 2, wherein the face plate is integrally formed with the platform.

5. The system of claim 1, wherein the platform is configured to support the aircraft galley insert so as to allow ventilation between the insert and a floor of the platform.

6. The system of claim 1, wherein the bracket is an L-shaped bracket.

7. The system of claim 1, wherein the platform is configured to fixedly attach to the aircraft galley insert.

8. The system of claim 7, wherein the platform is integrally formed with the aircraft galley insert.

9. The mounting system of claim 8, wherein the first and second side walls are first and second side walls of the aircraft galley insert.

10. The system of claim 1, wherein the drive rod is configured to be rotated using a screwdriver.

11. The system of claim 1, wherein the locking pins, upon extension, are configured to align with and insert into respective apertures in respective adjacent galley partitions.

12. The system of claim 1, wherein the locking pins, upon extension, are configured to align with and insert into respective brackets attached to the galley.

* * * * *